US008763161B2

(12) United States Patent
Cannara et al.

(10) Patent No.: US 8,763,161 B2
(45) Date of Patent: Jun. 24, 2014

(54) ZERO THERMAL EXPANSION, LOW HEAT TRANSFER, VARIABLE TEMPERATURE SAMPLE ASSEMBLY FOR PROBE MICROSCOPY

(71) Applicant: The National Institute of Standards and Technology, Gaithersburg, MD (US)

(72) Inventors: Rachel Cannara, Dickerson, MD (US); Fred Sharifi, Poolesville, MD (US); Zhao Deng, Gaithersburg, MD (US)

(73) Assignee: The United States of America, as Represented by the Secretary of Commerce, The National Institute of Standards and Technology, Washington, DC (US)

( * ) Notice: Subject to any disclaimer, the term of this patent is extended or adjusted under 35 U.S.C. 154(b) by 112 days.

(21) Appl. No.: 13/622,623

(22) Filed: Sep. 19, 2012

(65) Prior Publication Data

US 2013/0212750 A1     Aug. 15, 2013

(51) Int. Cl.
*G01Q 30/10* (2010.01)
(52) U.S. Cl.
CPC ............. *G01Q 30/10* (2013.01); *Y10S 977/871* (2013.01)
USPC ............................................ 850/13; 977/871
(58) Field of Classification Search
CPC ....................................................... G01Q 30/10
USPC .................... 250/443.1, 306; 850/13; 73/105; 977/871
See application file for complete search history.

(56) References Cited

U.S. PATENT DOCUMENTS

| 3,531,678 A | 9/1970 | Schiavone |
| 4,106,186 A | 8/1978 | Morgan, Jr. et al. |
| 4,629,862 A | 12/1986 | Kitagawa et al. |
| 5,148,026 A | 9/1992 | Watanabe et al. |
| 5,440,122 A | 8/1995 | Yasutake |
| 5,654,546 A * | 8/1997 | Lindsay ............................ 850/9 |
| 5,821,545 A * | 10/1998 | Lindsay et al. ............ 250/443.1 |
| 6,140,624 A | 10/2000 | Gilbert, Sr. |
| 6,185,992 B1 | 2/2001 | Daniels et al. |
| 7,497,613 B2 | 3/2009 | King et al. |
| 2010/0140497 A1 | 6/2010 | Damiano, Jr. et al. |
| 2011/0079710 A1 | 4/2011 | Damiano, Jr. et al. |

OTHER PUBLICATIONS

Musevic et al., "Temperature controlled microstage for an atomic microscope", Review of Scientific Instruments 67 (7), Jul. 1996, pp. 2554-2556.*

(Continued)

*Primary Examiner* — Jack Berman
(74) *Attorney, Agent, or Firm* — Mark E. Bandy; Rankin, Hill & Clark LLP

(57) ABSTRACT

A variable temperature assembly for scanning probe microscopy (SPM) is described which minimizes or eliminates motion of the sample caused by the thermal expansion or contraction of the sample holder assembly and platform/scanning stage on which the assembly is mounted, and minimizes heating or cooling of the platform/stage. In heater form, the variable temperature assembly includes a thin boron nitride puck with one or more high-resistivity wires embedded along an underside of the puck. The puck is suspended from its polished top surface by posts that are secured to the microscope stage. All thermal expansion of the puck occurs in the downward direction, away from the SPM probe-sample interface, thus eliminating relative motion between the probe tip and sample surface. The top surface of the puck remains stationary as a result of the unique geometry of the posts and the puck-post attachment configuration described herein.

17 Claims, 2 Drawing Sheets

(56) References Cited

OTHER PUBLICATIONS

"Thermodynamics of Titanium-Aluminum-Oxygen Alloys Studied," Research & Technology (R&T) reports on the World Wide Web. http://WWW.grc.nasa.gov/WWW/RT/RT2000/5000/5100B-copland1.html.

"Knudsen Cell", Wikipedia, the free encyclopedia, http://en.wikipedia.org/wiki/Knudsen_Cell.

\* cited by examiner

ZERO THERMAL EXPANSION, LOW HEAT TRANSFER, VARIABLE TEMPERATURE SAMPLE ASSEMBLY FOR PROBE MICROSCOPY

CROSS REFERENCES TO RELATED APPLICATIONS

This application claims priority upon U.S. provisional application Ser. No. 61/597,198 filed on Feb. 10, 2012.

FIELD

The present subject matter relates to scanning probe microscopy. More particularly, the present subject matter relates to temperature control of samples under investigation in a scanning probe microscope.

BACKGROUND

It is often desirable to control the temperature of a sample that is being studied in a scanning probe microscope (SPM) such as a scanning tunneling microscope (STM) or an atomic force microscope (AFM). This is because many aspects of surface structure and chemistry are sensitive to temperature, so variable temperature operation significantly increases the utility of the scanning probe microscope.

Scanning probe microscopes have been constructed which operate in a cryogenic fluid or inside a high vacuum chamber. In each case it is relatively straightforward to control the temperature of the sample, and/or the microscope as well. However, in the case of microscopes designed to operate in ambient air or some gas at or near ambient pressure, it is more difficult to design a heated or cooled sample stage. The reason is that convection caused by hot or cold gasses and temperature gradients across the microscope (the body of which is assumed to be at ambient temperature) causes mechanical instabilities which degrade the resolution of the microscope.

More specifically, current variable temperature designs suffer both from thermal expansion and stage heating issues, which impact the ability of users to perform temperature-dependent measurements in a scanning probe microscope. When thermal expansion or contraction occurs, the piezoelectric actuators must compensate in an opposite direction, often using up their dynamic range. Lateral drift of the scanned region also occurs and is detrimental to experiments. Furthermore, many scanning probe microscopes employ a sample scanning configuration, in which the sample is mounted on a stage that is directly coupled to the piezoelectric actuators. Heating the sample in this configuration can also overheat the piezoelectric materials, leading to inaccuracy or failure of the scanner. Accordingly, conventional variable temperature experiments are either limited in temperature or must be performed on tip/probe scanning microscopes. Nonetheless, thermal expansion/contraction by the heater stage affects all types of scanning probe microscopes.

Although various strategies have been described in the prior art, a need remains for an effective approach for reducing, or ideally eliminating, motion of a sample caused by thermal expansion or contraction of the stage or other member supporting the sample.

SUMMARY

The difficulties and drawbacks associated with previously known technology are addressed in the present products and methods.

In one aspect, the present subject matter provides a heated or cooled stage for a scanning probe microscope. The heated or cooled stage comprises (i) a stage, (ii) two support posts, each support post including a vertical support extending from the stage and a lateral arm extending toward a central region of the stage, and (iii) a sample substrate defining a top face and disposed between and supported by the two support posts. The sample substrate is spaced above the stage by a vertical separation space, and horizontally spaced from each of the two posts by a lateral separation space such that thermal effects of the heated or cooled stage do not result in a change in the vertical position of the top face of the sample substrate.

In another aspect, the present subject matter provides a heated or cooled stage for a scanning probe microscope. The heated or cooled stage comprises (i) a stage, (ii) at least two support posts, each support post including a vertical support extending from the stage and a lateral arm extending toward a central region of the stage. The support posts include a material selected from the group consisting of nickel alloys and lithium aluminosilicate glass ceramics. The heated or cooled stage also comprises (iii) a sample substrate defining a top face and disposed between and supported by the support posts. The sample substrate includes boron nitride. The sample substrate is spaced above the stage by a vertical separation space, and horizontally spaced from each of the two posts by a lateral separation space such that thermal effects of the heated or cooled stage do not result in a change in the vertical position of the top face of the sample substrate.

In still another aspect, the present subject matter provides a method for reducing thermal expansion or contraction of a sample stage adapted for use in a scanning probe microscope. The method comprises providing a heated or cooled stage including (i) a stage, (ii) a plurality of support posts, each extending from the stage and laterally toward a central region of the stage, and (iii) a sample substrate defining a top face and disposed between and supported by the support posts. The method also comprises positioning the sample substrate above the stage by a vertical separation space and horizontally spaced from each of the posts by a lateral separation space such that thermal expansion or contraction of the stage does not result in a change in the vertical position of a top face of the sample or substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides a zero thermal expansion, low thermal transfer assembly for varying the temperature of a sample in a scanning probe microscope (SPM)

system or process. The present subject matter applies not only to heating or cooling of samples, but extends to any variable temperature system where thermal expansion or contraction could occur, including low temperature measurements.

To perform variable temperature measurements in an SPM, the sample is typically mounted onto a heater assembly that, in turn, mounts onto the sample stage. This stage is either stationary or coupled to an actuator. In both cases, prior to the present subject matter, varying the temperature of the sample typically causes thermal expansion or contraction of the assembly as a whole. This leads to motion of the sample along directions of thermal expansion or contraction. Additional problems arise for sample-scanning setups (with the stage coupled to an actuator), as actuators are typically temperature-sensitive and have a limited temperature range over which they can maintain accuracy and operate safely. In these cases, thermal conduction between the sample heater/cooler and the sample stage and actuators can cause actuator error or failure. The present subject matter circumvents both problems in that it eliminates heater/cooler assembly thermal expansion/contraction effects by referencing the sample surface. And, the present subject matter minimizes conductive heat transfer between the variable-temperature source and sample stage/actuators through its unique configuration. Although the present subject matter is primarily described in terms of heating of samples, it will be understood that the subject matter also applies to cooling of samples.

Figure 1:
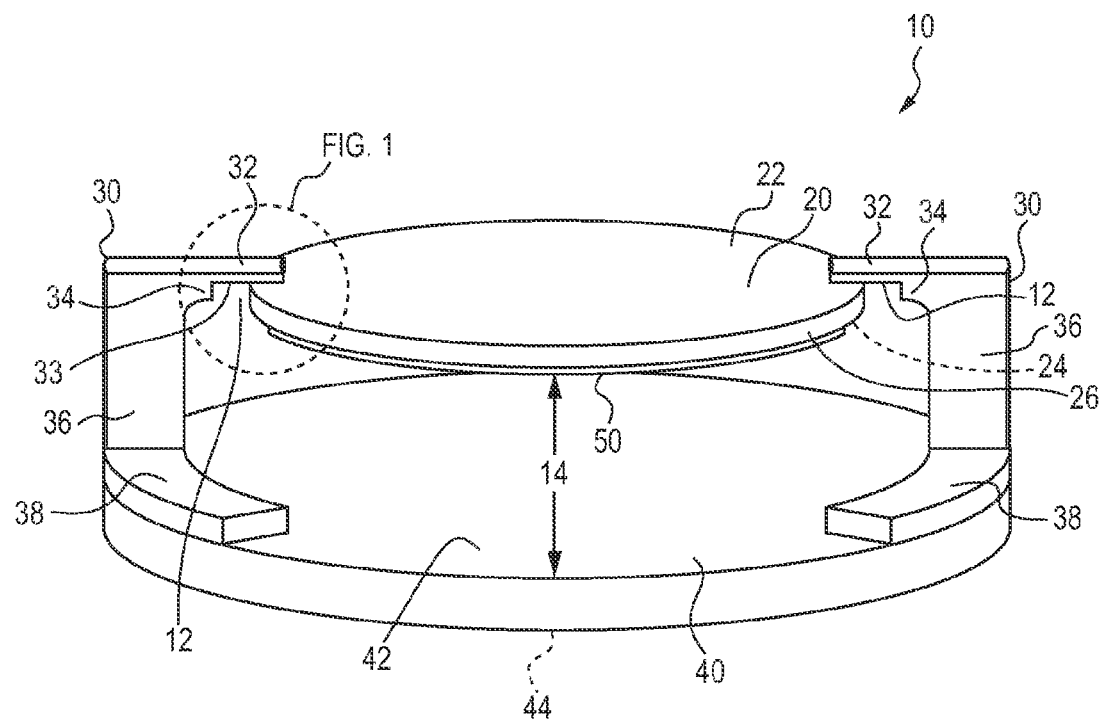
FIG. 1 is a schematic perspective view of a heating assembly for probe microscopy in accordance with the present subject matter.

FIG. 1 is a schematic view of a preferred embodiment heater assembly 10 in accordance with the present subject matter. The assembly 10 comprises a sample substrate 20 which is sometimes referred to in the art as a "puck." The sample substrate 20 defines a top face 22, an oppositely directed underside 24, and a peripheral edge 26 generally separating the faces 22, 24 from one another and generally extending around the perimeter of the sample substrate 20. The assembly 10 also comprises at least one, and typically two support posts 30 which support the sample substrate 20, as described in greater detail herein. Each support post 30 includes an inwardly extending lateral arm 32 defining a downwardly directed mounting face 33, a shoulder 34, and at least one of a vertical support 36 and/or a base 38. As shown in FIG. 1, the lateral arm 32 generally extends horizontally outward from the vertical support 36 and toward a central region of the sample substrate and/or the stage. The sample substrate 20 is disposed between and supported by the two support posts 30. The assembly 10 also comprises a stage 40 which defines a top face 42 and an oppositely directed underside 44. The assembly 10 additionally comprises an electrically resistive heater 50 which is disposed along the underside 24 of the sample substrate 20. Each of these components, their preferred materials and/or characteristics, and their preferred mounting configurations are described in greater detail as follows.

The sample substrate 20 or "puck" can be in a wide array of shapes and sizes. However, for many applications the sample substrate 20 is in the shape of a flat disk having a uniform thickness, hence the term "puck." Although not wishing to be limited to any particular dimensions, typical thicknesses of the substrate 20 are from about 0.5 mm to about 5 mm, with 1 mm being most typical. Typical diameters of the substrate 20 range from about 10 mm to about 25 mm, with 15 mm being most typical. The sample substrate 20 preferably exhibits a relatively high thermal conductivity and can be formed from a wide array of materials.

A preferred characteristic of the material selected for use as the sample substrate 20 is that the material exhibit a relatively high thermal conductivity. The term "relatively high thermal conductivity" as used herein refers to a thermal conductivity of at least 100 W/m·K, more preferably at least 200 W/m·K, more preferably at least 300 W/m·K, and most preferably at least 400 W/m·K. An example of a preferred material for use as the sample substrate is boron nitride which can exhibit thermal conductivities as high as 1700 to 2000 W/m·K.

A particularly preferred boron nitride is hot pressed boron nitride. Not pressed boron nitride is compacted at temperatures up to 2000° C. and pressures up to 2000 psi to form a dense, strong engineering material that can be readily machined. The top face 22 of the sample substrate 20 is preferably polished to provide a smooth finish.

The support posts 30 are preferably formed from one or more materials having a relatively low coefficient of thermal expansion (CTE). The term "relatively low coefficient of thermal expansion" refers to CTE values less than $5 \times 10^{-6}$/K, more preferably less than $2 \times 10^{-6}$/K, and most preferably less than $1.5 \times 10^{-6}$/K. These CTE values are measured between 20° C. and 100° C. Examples of preferred materials for use in forming the posts 30 include, but are not limited to, certain nickel alloys including FeNi36 (also known as 64 FeNi) and which is commercially available under the designation INVAR, Fe-33Ni-4.5 Co and which is commercially available under the designation INOVCO, FeNi42 and which is commercially available under the designation NILO, and other FeNiCo alloys such as KOVAR and/or DILVER P. Table 1 summarizes these representative preferred nickel alloys with low CTE's:

TABLE 1

Nickel Alloys Having Low CTE's

| Alloy | CTE ($K^{-1}$) |
|---|---|
| FeNi36 (64 FeNi) (INVAR) | $1.2 \times 10^{-6}$ |
| Fe—33Ni—4.5Co (INOVCO) | $0.55 \times 10^{-6}$ |
| FeNi42 (NILO) | Approximately $5.3 \times 10^{-6}$ |
| KOVAR | — |
| DILVER P | — |

Additional examples of materials exhibiting relatively low CTE's include, but are not limited to, certain lithium aluminosilicate glass ceramics such as the material available under the designation ZERODUR from Schott Glass Technologies. The CTE of the ZERODUR material is approximately $0.05 \times 10^{-6}$/K at 20° C. to 100° C.

Although the version of the heated stage or heater assembly depicted in FIG. 1 uses a plurality and specifically, two posts 30, it will be appreciated that the stage or assembly may utilize more than two posts such as three or four. It is also contemplated that more than four posts could be utilized and that a single post could be utilized.

Figure 2:
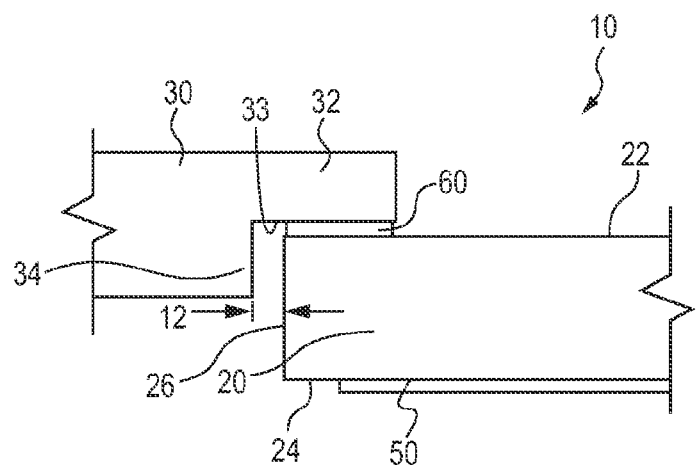
FIG. 2 is a schematic detailed side view of a portion of the heating assembly depicted in FIG. 1.

The resistive heater, schematically denoted as 50 in FIGS. 1 and 2, is preferably disposed along an underside 24 or located proximate to the underside 24 of the sample substrate 20. The resistive heater 50 is in intimate thermal contact with the sample substrate 20 such that a high degree or extent of heat transfer occurs from the heater 50 to the sample substrate 20. The heater 50 can be provided in a wide array of forms such as a plurality of patterned electrodes, wires or other conductors extending across desired regions of the sample substrate 20. The heater 50 can also be provided in the form of a thin film heater as known in the art. The characteristics of the heater and its operation are selected so that the temperature of a sample positioned on the top face 22 of the substrate 20 can be varied within a range of from about 10° C. to about 190° C. and typically from about 20° C. to about 180° C. It will be appreciated that the heater 50 and in particular the heater assembly 10 can be configured to operate within temperature regimes outside of these typical ranges. The heater may be replaced by a cooling element, or a heating and cooling unit, such as a Peltier element, in which case one or more heat sink channel(s) would be mounted to the underside of the element and attached to a heat sink block residing an adequate distance from the stage 40. Peltier elements are available from various commercial sources such as Tellurex of Traverse City, Mich.; TECA Corp. of Chicago, Ill.; and Eureca Messtechnik GmbH of Koln, Germany. An example of a heat sink channel attached to a heat sink block is a braided copper wire attached to the element, e.g. a Peltier element, and also attached to a mass of a material such as a metal positioned a sufficient distance from the stage or scanner.

The present subject matter also provides particular mounting configurations for the sample substrate 20. Referring further to FIGS. 1 and 2, the sample substrate 20 is affixed or secured to a distal end of the lateral arm 32 of each post 30 by a region 60 of a deformable bonding agent such as an adhesive. A wide array of adhesives can be used for the deformable bonding agent such as high temperature epoxies. The region 60 of bonding agent is preferably disposed between and directly contacting the downwardly directed face 33 of the lateral arm 32 of each of the posts 30, and a peripheral region of the top face 22 of the sample substrate 20. Moreover, the posts 30 and their lateral arms 32 and shoulders 34 are positioned relative to the peripheral edge 26 of the sample substrate 20 such that a lateral separation or space 12 is provided. Although not wishing to be bound to any particular dimensions for the lateral space 12, representative thicknesses may for example be from about 0.1 mm to about 1.0 mm.

In addition, the present subject matter also provides a vertical separation or space 14 between (i) the underside 24 of the sample substrate 20 or the heater 50, and (ii) the top face 42 of the stage 40. Again, not wishing to be bound to any particular dimensions for the vertical space 14, representative distances can for example be from about 1 mm to about 10 mm and typically about 5 mm.

The present subject matter and the unique mounting configuration using the posts and sample substrate as described herein provide several benefits and advantages. The boron nitride puck (or whatever material is chosen, in this case for quick, uniform distribution of temperature) may in fact expand with heating, but all vertical expansion is downward and away from the scanning probe microscopy tip-sample contact. The horizontal plane along which the atomic force microscope tip makes contact with the sample is stationary, as defined by the adhesive joint positions between the cantilever structure of the posts (e.g., INVAR or ZERODUR) and the top surface of the sample substrate.

This unique mounting structure makes vertical thermal expansion of the sample substrate essentially irrelevant.

Another advantage of the mounting configuration relates to the positioning of the posts and their lateral arms relative to the sample substrate. That is, thermal expansion of the cantilever structure itself does not have an impact on the vertical position of the SPM Lip-sample contact plane. The inverted stair structure of each post is designed so that the adhesive joint is located at the neutral axis of the cantilevers (along the central horizontal plane of the structure). By definition, these axes will not deflect vertically. Hence the top surface of the sample substrate will remain stationary. To accommodate any human errors in mounting (i.e. being slightly away from the neutral axis), materials with extremely low coefficients of expansion (CTE) are utilized. In addition, while INVAR is a good material to machine and use for most applications, it is magnetic and potentially not useful for studies involving magnetic materials. Thus, supports can be formed from other materials such as ZERODUR (more difficult to machine but not magnetic), which happens to exhibit a significantly lower CTE, as well.

The present subject matter also increases the temperature range over which various instruments or analyses can be performed. That is, by reducing or eliminating thermal expansion/contraction effects, new applications or extended analyses will be made possible by the present subject matter.

The present subject matter and in particular, the heater assembly as described herein, includes numerous variations and alternative versions. For example, the heater assembly can be used in or confined within other environments such as those in which air is replaced entirely or partially by one or more other agents to further reduce convective heat transfer. It is also contemplated that the sample substrate or "puck" can be configured to include one or more sample-receiving or sample-retaining regions such as a window accessible along a bottom face of the sample substrate, supporting a sample from its top surface and thus aligning the sample face with the reference plane defined by the top surface of the puck. For example, it is contemplated that one or more partial cutouts or recesses may be formed in the puck, such as along one or more of the faces of the puck, to receive a sample. The recesses are sized and configured so that the surface of the sample disposed therein is aligned with the thermal reference plane.

EXAMPLES

Figure 3:
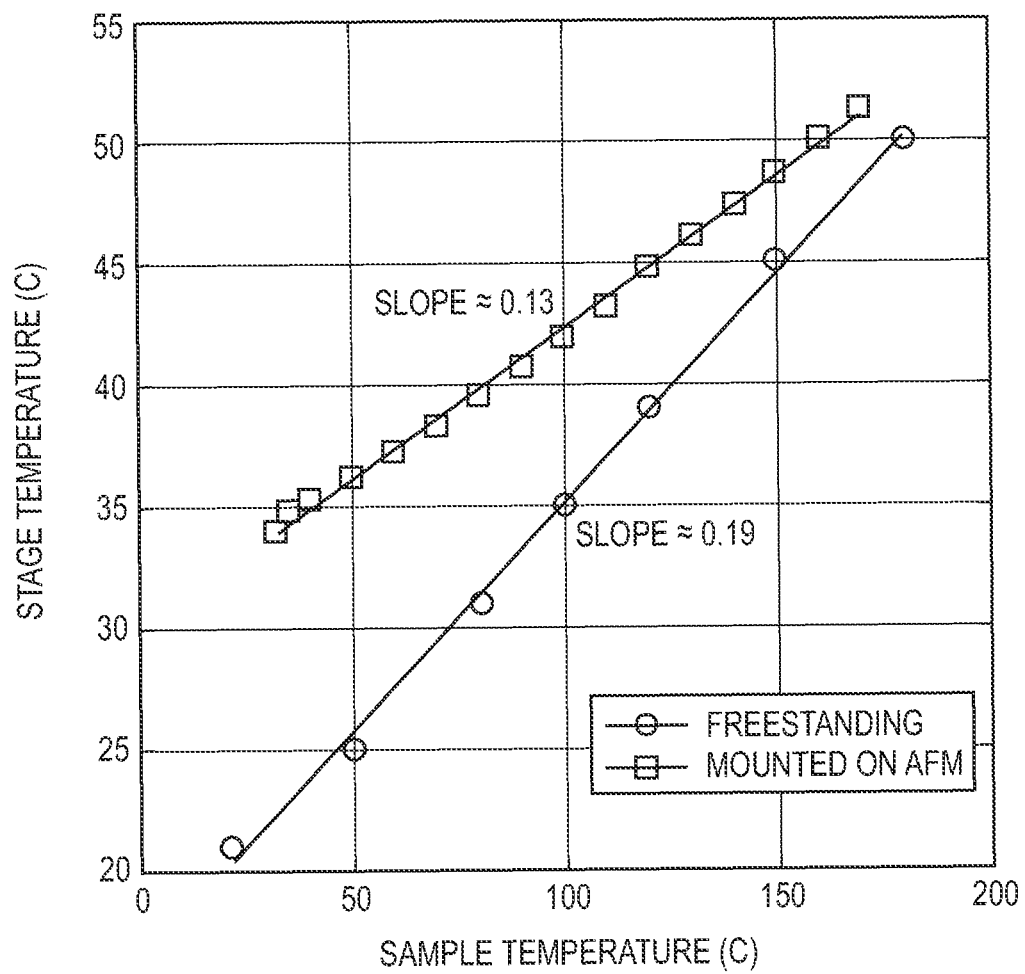
FIG. 3 is a graph comparing heat transfer between a stage and a sample for a conventional free standing heating assembly and a heating assembly in accordance with the present subject matter.

A heater assembly as described herein and schematically depicted in FIGS. 1 and 2 was constructed. Temperature measurements were made of the stage and sample as a heater of the assembly was operated to increase the sample temperature from 20° C. to 180° C. Temperatures of the sample and the stage were plotted on a graph presented herein as FIG. 3 as an indication of heat transfer to the stage, The slope of that temperature line is approximately 0.13.

A similar heater assembly however using a conventional freestanding support configuration was obtained and similar temperature measurements were obtained over the same range of temperatures. The resulting data is plotted in FIG. 3 and results in a temperature line having a slope of approximately 0.19.

The slope, i.e. extent of heat transfer to the stage, of 0.19 for the conventional free standing support configuration is significantly greater than the slope, i.e. extent of heat transfer to the stage, of 0.13 for the present subject matter heater assembly represents a surprising advancement in the art.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A heated or cooled stage for a scanning probe microscope, the heated or cooled stage comprising:
    a stage;
    two support posts, each support post including a vertical support extending from the stage and a lateral arm extending toward a central region of the stage;
    a sample substrate defining a top face and disposed between and supported by the two support posts;
    wherein the sample substrate is spaced above the stage by a vertical separation space, and horizontally spaced from each of the two posts by a lateral separation space such that thermal effects of the heated or cooled stage do not result in a change in the vertical position of the top face of the sample substrate.

2. The heated or cooled stage of claim 1 wherein the sample substrate is secured to the two posts by a deformable bonding agent.

3. The heated or cooled stage of claim 2 wherein each of the lateral arms of the two support posts defines a downwardly directed mounting face, and the bonding agent is disposed between the downwardly directed mounting faces of the two posts and peripheral regions of the top face of the sample substrate.

4. The heated or cooled stage of claim 1 wherein the sample substrate comprises a material having a relatively high thermal conductivity.

5. The heated or cooled stage of claim 4 wherein the material of the sample substrate is boron nitride.

6. The heated or cooled stage of claim 1 wherein the two support posts comprise a material having a relatively low coefficient of thermal expansion.

7. The heated or cooled stage of claim 6 wherein the material of the support posts is selected from nickel alloys and lithium aluminosilicate glass ceramics.

8. A heated or cooled stage for a scanning probe microscope, the heated or cooled stage comprising:
    a stage;
    at least two support posts, each support post including a vertical support extending from the stage and a lateral arm extending toward a central region of the stage, the support posts including a material selected from the group consisting of nickel alloys and lithium aluminosilicate glass ceramics;
    a sample substrate defining a top face and disposed between and supported by the support posts, the sample substrate including boron nitride;
    wherein the sample substrate is spaced above the stage by a vertical separation space, and horizontally spaced from each of the two posts by a lateral separation space such that thermal effects of the heated or cooled stage do not result in a change in the vertical position of the top face of the sample substrate.

9. The heated or cooled stage of claim 8 wherein the sample substrate is secured to the two posts by a deformable bonding agent.

10. The heated or cooled stage of claim 9 wherein each of the lateral arms of the two support posts defines a downwardly directed mounting face, and the bonding agent is disposed between the downwardly directed mounting faces of the two posts and peripheral regions of the top face of the sample substrate.

11. A method for reducing thermal expansion or contraction of a sample stage adapted for use in a scanning probe microscope, the method comprising:
    providing a heated or cooled stage including (i) a stage, (ii) a plurality of support posts, each extending from the stage and laterally toward a central region of the stage, and (iii) a sample substrate defining a top face and disposed between and supported by the support posts;
    positioning the sample substrate above the stage by a vertical separation space and horizontally spaced from each of the posts by a lateral separation space such that thermal expansion or contraction of the stage does not result in a change in the vertical position of a top face of the sample substrate.

12. The method of claim 11 wherein the sample substrate is secured to the two posts by a deformable bonding agent.

13. The method of claim 12 wherein each of the support posts defines a downwardly directed mounting face, and the bonding agent is disposed between the downwardly directed mounting faces of the posts and peripheral regions of a top face of the sample substrate.

14. The method of claim 11 further comprising:
    forming the sample substrate from a material having a relatively high thermal conductivity.

15. The method of claim 14 wherein the material of the sample substrate is boron nitride.

16. The method of claim 11 further comprising forming the support posts from a material having a relatively low coefficient of thermal expansion.

17. The method of claim 16 wherein the material of the support posts is selected from nickel alloys and lithium alumninosilicate glass ceramics.

* * * * *